United States Patent
Li et al.

(10) Patent No.: US 9,312,781 B2
(45) Date of Patent: Apr. 12, 2016

(54) CONTROL METHOD DURING ZERO-CROSSING OPERATION OF BRIDGE ARMS IN UPS

(75) Inventors: Junlin Li, Shenzhen (CN); Xiaobo Fan, Shenzhen (CN); Yanquan Zhang, Shenzhen (CN); Lihua Xie, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 455 days.

(21) Appl. No.: 13/817,229

(22) PCT Filed: Jun. 8, 2011
(Under 37 CFR 1.47)

(86) PCT No.: PCT/CN2011/075472
§ 371 (c)(1),
(2), (4) Date: Oct. 1, 2013

(87) PCT Pub. No.: WO2012/024959
PCT Pub. Date: Mar. 1, 2012

(65) Prior Publication Data
US 2014/0104897 A1 Apr. 17, 2014

(30) Foreign Application Priority Data
Aug. 25, 2010 (CN) .......................... 2010 1 0262498

(51) Int. Cl.
*H02M 5/45* (2006.01)
*H02M 5/458* (2006.01)
*H02J 9/06* (2006.01)

(52) U.S. Cl.
CPC ............. *H02M 5/4585* (2013.01); *H02J 9/062* (2013.01); *H02J 2009/063* (2013.01)

(58) Field of Classification Search
CPC ........ H02M 5/4585; H02M 5/458; H02J 3/36

USPC ............ 363/16, 17, 34, 35, 37, 98, 131, 132, 363/40, 41, 44, 46, 52, 55, 78, 84, 95, 124, 363/125, 135; 323/205, 207; 315/224; 307/44, 45, 46, 48, 64, 66
See application file for complete search history.

(56) References Cited

U.S. PATENT DOCUMENTS 5,416,686 A * 5/1995 Azuma ............... H02M 5/4585
363/37
5,959,858 A * 9/1999 Kanouda ............. H02M 1/4233
363/149

(Continued)

FOREIGN PATENT DOCUMENTS

| CN | 102005938 A | 4/2011 |
| JP | 8-126352 A | 5/1996 |
| JP | 2001157441 A | 6/2001 |

OTHER PUBLICATIONS
International Search Report for PCT/CN2011/075472 (four pages), mailed Aug. 25, 2011; ISA/CN.

*Primary Examiner* — Adolf Berhane
*Assistant Examiner* — Alex Torres-Rivera
(74) *Attorney, Agent, or Firm* — Harness, Dickey & Pierce, P.L.C.

(57) ABSTRACT

A control method is disclosed that involves controlling zero-crossing operation of bridge arms in a UPS, wherein the UPS has a rectifying bridge with first and second switching transistors, a midline bridge arm with third and fourth switching transitors, and an inverter bridge arm with fifth and sixth switching transitors. The midline and rectifying bridge arms are controlled to cross zero synchronously. The inverter bridge arm is controlled to be disconnected during a period before a zero-crossing point of the rectifying bridge arm to a period after the zero-crossing point of the rectifying bridge arm. The periods before and after the zero-crossing point of the rectifying bridge arm are time differences between the zero-crossing points of the inverter bridge arm and the rectifying bridge arm. The influence of asynchronous zero-crossing between the PFC circuit and the inverter circuit on the UPS performance indices may be reduced by using the present control method.

12 Claims, 9 Drawing Sheets

(56) References Cited

U.S. PATENT DOCUMENTS 6,314,007 B2 * 11/2001 Johnson, Jr. .................. 307/66
2001/0026460 A1 10/2001 Ito et al.
2002/0109412 A1 8/2002 Johnson, Jr.

* cited by examiner

US 9,312,781 B2

CONTROL METHOD DURING ZERO-CROSSING OPERATION OF BRIDGE ARMS IN UPS

CROSS-REFERENCE TO RELATED APPLICATIONS

This application is a U.S. National Stage Application of International Application No. PCT/CN2011/075472, filed Jun. 8, 2011. This application claims the benefit and priority to Chinese Application No. 201010262498.0, filed Aug. 25, 2010. The disclosures of the above applications are incorporated herein by reference.

TECHNICAL FIELD

The present invention relates to a control method for an uninterruptible power supply (UPS), and more particularly, to a control method during zero-crossing operation of bridge arms in a UPS.

BACKGROUND ART

In the existing uninterruptible power supply, the main circuit topology thereof is shown in FIG. 1. As shown in FIG. 1, an inductance L1, a first switching transistor Q1, a second switching transistor Q2, a body diode of a third switching transistor Q3, and a body diode of a fourth switching transistor Q4 constitute a power factor correction (PFC) circuit. The third switching transistor Q3, the fourth switching transistor Q4, a fifth switching transistor Q5, a sixth switching transistor Q6, an inductance L2, and a capacitance C2 constitute a full-bridge inverter circuit. After power factor correction by the PFC circuit, the input current becomes a sine wave in phase with the mains power supply and has low harmonic content. The full-bridge inverter circuit then provides the load a high-quality sine voltage inverted from the DC voltage, which is outputted by the PFC circuit.

To analyze the structure of the circuit, the bridge arm consisting of the first switching transistor Q1 and the second switching transistor Q2 is referred to as a rectifying bridge arm. The bridge arm consisting of the third switching transistor Q3 and the fourth switching transistor Q4 is referred to as a midline bridge arm, and the bridge arm consisting of the fifth switching transistor Q5 and the sixth switching transistor Q6 is referred to an inverter bridge arm. The midline bridge arm consisting of the third switching transistor Q3 and the fourth switching transistor Q4 is shared by the PFC circuit and a full-bridge inverter circuit. Therefore, the first advantage of this circuit topology is less switching transistors and lower circuit cost. Since the PFC circuit sharing the midline bridge arm with the full-bridge inverter circuit, and the rectified current of the PFC circuit and the inverted current of the inverter circuit passing through the switching transistors of the midline bridge arm (Q3 or Q4) are in opposite directions to each other in most of cases, which may be counteracted mostly, the current passing through the third switching transistor Q3 and the fourth switching transistor Q4 is small. Thus the power consumption thereon is small as well. Therefore, the second advantage of this circuit topology is the high operating efficiency of the UPS circuitry.

Since there is a shared midline bridge arm, the operation of the PFC circuit and that of the inverter circuit have to operate synchronously. Otherwise, the circuit cannot operate normally. However, due to different zero-crossing switching modes of the PFC circuit and the inverter circuit or the errors in phase-locking and in the controlled quantity, there will be error of zero-crossing synchronization between the PFC circuit and the inverter circuit. It is always the cases that the PFC circuit zero-crossing leads the inverter circuit with one or even several switching cycles, or the inverter circuit zero-crossing leads the PFC circuit with one or even several switching cycles. If only considering zero-crossing synchronization of the midline bridge arm and the PFC circuit regardless of the zero-crossing of the inverter circuit, or only considering zero-crossing synchronization of the midline bridge arm and the inverter circuit regardless of the zero-crossing of the PFC circuit during the zero-crossing switching, the output voltage or the input current of the UPS would oscillate, which then influences the performance indices of the UPS, such as, the Total Harmonic Distortion of Voltage (THDv) of the output voltage and the Total Harmonic Distortion of Current (THDi) of the input current.

INVENTION SUMMARY

A technical problem to be resolved is to overcome the shortages mentioned above, to present a control method during zero-crossing operation of the bridge arms in a UPS, and to reduce the influence on the UPS performance indices caused by synchronization errors during zero-crossing operation.

In one important aspect of the present disclosure relates to a control method for use during zero-crossing operation of bridge arms in a UPS. The UPS includes a rectifying bridge arm consisting of a first switching transistor and a second switching transistor, a midline bridge arm consisting of a third switching transistor and a fourth switching transistor, and an inverter bridge arm consisting of a fifth switching transistor and a sixth switching transistor. The method may comprise controlling the midline bridge arm and the rectifying bridge arm to cross zero synchronously and controlling the inverter bridge arm to be disconnected within a period before a zero-crossing point of the rectifying bridge arm to a period after the zero-crossing point of the rectifying bridge arm. The periods before and after the zero-crossing point of the rectifying bridge arm are both time differences between a zero-crossing point of the inverter bridge arm and the zero-crossing point of the rectifying bridge arm. Wherein, the zero-crossing point of the rectifying bridge arm is zero-crossing of the rectifying bridge arm from a positive half cycle to a negative half cycle or zero-crossing of the rectifying bridge arm from the negative half cycle to the positive half cycle.

In one aspect, when the rectifying bridge arm is crossing zero from the positive half cycle to the negative half cycle, within the period before the zero-crossing point of the rectifying bridge arm, the third switching transistor is turned off, the fourth switching transistor is turned on, and the fifth and the sixth switching transistors are both turned off. Within the period after the zero-crossing point of the rectifying bridge arm, the third switching transistor is turned on, the fourth switching transistor is turned off, and the fifth and the sixth switching transistors are both turned off. The period before and the period after the zero-crossing point of the rectifying bridge arm are both twice of the cycle of the driving signal for the fifth or sixth switching transistor.

When the rectifying bridge arm is crossing zero from the negative half cycle to the positive half cycle, within the period before the zero-crossing point of the rectifying bridge arm, the third switching transistor is turned on, the fourth switching transistor is turned off, and the fifth and the sixth switching transistors are both turned off. Within the period after the zero-crossing point of the rectifying bridge arm, the third switching transistor is turned off, the fourth switching transistor is turned on, the fifth and the sixth switching transistors are both turned off. The period before and the period after the zero-crossing point of the rectifying bridge arm are both twice of the cycle of the driving signal for the fifth or sixth switching transistor.

The technical problems in the present invention will be resolved by further solutions as follows: In another aspect of the present disclosure, a control method is disclosed for use during zero-crossing operation of bridge arms in a UPS. The UPS includes a rectifying bridge arm consisting of a first switching transistor and a second switching transistor, a midline bridge arm consisting of a third switching transistor and a fourth switching transistor, and an inverter bridge arm consisting of a fifth switching transistor and a sixth switching transistor. The method comprises controlling the midline bridge arm and the inverter bridge arm to cross zero synchronously and controlling the rectifying bridge arm to be disconnected within a period before a zero-crossing point of the inverter bridge arm to a period after the zero-crossing point of the inverter bridge arm. The periods before and after the zero-crossing point of the inverter bridge arm are both the time differences of the zero-crossing point of the rectifying bridge arm and the zero-crossing point of the inverter bridge arm. The zero-crossing point of the inverter bridge arm is the inverter bridge arm zero-crossing from the positive half cycle to the negative half cycle, or the inverter bridge arm zero-crossing from the negative half cycle to the positive half cycle.

In various aspects, when the inverter bridge arm is crossing zero from the positive half cycle to the negative half cycle, the third switching transistor is turned off, the fourth switching transistor is turned on, and the first and the second switching transistors are both turned off within the period before the zero-crossing point of the inverter bridge arm. The third switching transistor is turned on, the fourth switching transistor is turned off, and the first and second switching transistors are both turned off within the period after the zero-crossing point of the inverter bridge arm. The period before and the period after the zero-crossing point of the inverter bridge arm are both twice of the cycle of a driving signal for the first or second switching transistor.

When the inverter bridge arm is crossing zero from the negative half cycle to the positive half cycle, the third switching transistor is turned on, the fourth switching transistor is turned off, and the first and the second switching transistors are both turned off within the period before the zero-crossing point of the inverter bridge arm. The third switching transistor is turned off, the fourth switching transistor is turned on, and the first and the second switching transistors are both turned off within the period after the zero-crossing point of the inverter bridge arm; the period before and the period after the zero-crossing point of the inverter bridge arm are both twice of the cycle of a driving signal for the first or second switching transistor.

Important advantages of the present invention in comparison with the prior art are that the control method, during bridge arm operation in a UPS, and when zero-crossing switching, controls the midline bridge arm and the rectifying bridge arm to operate synchronously, and at the same time controls the inverter bridge arm to stop operating, and turns off the switching transistors that forms the UPS output voltage oscillating loop in the inverter bridge arm. This may avoid the UPS output voltage oscillating caused by asynchronous zero-crossing of the midline bridge arm and the inverter bridge arm, thereby effectively reducing the influence of above-mentioned asynchrony on the UPS performance index THDv. On the other hand, when zero-crossing switching, the method controls the midline bridge arm and the inverter bridge arm to operate synchronously, and at the same time controls the rectifying bridge arm to stop operating, and disconnects the switching transistor that forms the UPS output voltage oscillating loop in the rectifying bridge arm. This may avoid the UPS output voltage oscillating causing by asynchronous zero-crossing of the rectifying bridge arm and the midline bridge arm, thereby effectively reducing the influence of the above mentioned asynchrony on the UPS performance index THDi. The method of the present invention forces the switching transistors in the bridge arms causing oscillating nearby the zero-crossing to be turned off, which is simple and easy to implement, and may effectively reduce the influence of the asynchronous zero-crossing switch of the inverter circuit and the PFC circuit on the UPS performance indices.

BRIEF DESCRIPTION OF THE DRAWINGS

Example embodiments will now be described more fully with reference to the accompanying drawings.

DETAILED DESCRIPTION OF THE PREFERRED EMBODIMENTS

The invention will be described in further detail hereinafter with reference to the embodiments and the accompanying drawings.

First, the circuit and the operating principle of the circuit used by one embodiment of the present invention will be described briefly.

Figure 1:
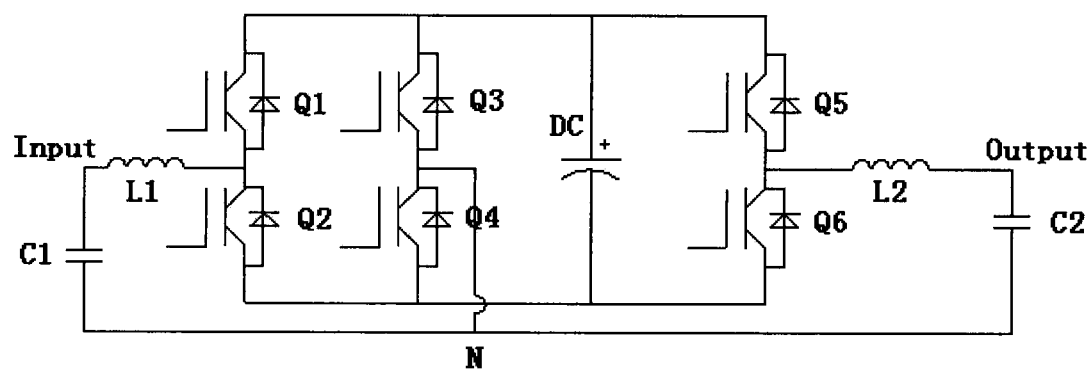
FIG. 1 is a topology of the UPS main circuit in the prior art.

Referring to the circuit structure as shown in FIG. 1 again, the UPS comprises a rectifying bridge arm consisting of a first switching transistor Q1 and a second switching transistor Q2, a midline bridge arm consisting of a third switching transistor Q3 and a fourth switching transistor Q4, and an inverter bridge arm consisting of a fifth switching transistor Q5 and a sixth switching transistor Q6.

There are three synchronous operating statuses in the UPS circuit. The first is the PFC circuit and the inverter circuit both operating in the positive half cycle, i.e., corresponding to the positive half cycle of the input of the mains power supply or the positive half cycle of the output voltage. The second is the PFC circuit and the inverter circuit operating synchronously in the negative half cycle, i.e., corresponding to the negative half cycle of the input of the mains power supply or the negative half cycle of the output voltage. The third is the PFC circuit and the inverter circuit operating in the zero-crossing status from the positive to the negative half cycle or from the negative to the positive half cycle. Only because of the synchronization error, the zero-crossing point of the inverter circuit may be either a period earlier or later than the zero-crossing point of the PFC circuit, which corresponds to the zero-crossing point of the input of the mains power supply or the output voltage. The control in the first and the second synchronization operating statuses is known in the prior art, which will be described briefly below.

In the first synchronization status, i.e. when the PFC circuit is operating in the positive half cycle and the inverter circuit is also operating in the positive half cycle, in the rectifying bridge arm the first switching transistor Q1 turns off. The second switching transistor Q2 operates based on the control quantity of the PFC and the pulse-width modulation signal generated by the carrier wave for boost control. In the midline bridge arm, the third switching transistor Q3 turns off and the fourth switching transistor Q4 turns on. In the inverter bridge arm the fifth switching transistor Q5 adopts the SPWM control and operates based on the control quantity of the inverter and the driving signal generated by the carrier wave. The driving signal of the sixth switching transistor Q6 and the driving signal of the fifth switching transistor Q5 compensate each other, i.e. the sixth switching transistor Q6 and the fifth switching transistor Q5 operate complementarily.

In the second synchronization status—the PFC circuit is operating in the negative half cycle and the inverter circuit is also operating in the negative half cycle. In the rectifying bridge arm the first switching transistor Q1 operates based on the control quantity of the PFC and the pulse-width modulation signal generated by the carrier wave for boost control, and the second switching transistor Q2 turns off. In the midline bridge arm the third switching transistor Q3 turns on and the fourth switching transistor Q4 turns off; in the inverter bridge arm, the sixth switching transistor Q6 adopts the SPWM control and operates based on the control quantity of the inverter and the driving signal generated by the carrier wave. The driving signal of the fifth switching transistor Q5 and the driving signal of the sixth switching transistor Q6 compensate each other, i.e., the fifth switching transistor Q5 and the sixth switching transistor Q6 operate complementarily.

The present invention mainly aims to the third status, i.e. controlling zero-crossing of the bridge arms in the UPS. During the period before and after the zero-crossing point of the rectifying bridge arm, the midline bridge arm and the rectifying bridge arm are controlled to cross zero synchronously, and the inverter bridge arm turns off; or during the period before and after the zero-crossing point of the inverter bridge arm, the midline bridge arm and the inverter bridge arm are controlled to cross zero synchronously, and the rectifying bridge arm turns off. The period before and after the zero-crossing point for turning off the inverter bridge arm or the rectifying bridge arm should be determined and adjusted in consideration of the following two principles: if the turning-off period is less than the asynchronous time difference between the PFC circuit and the inverter circuit, the reduced performance brought by the synchronization error cannot be completely avoided; if the turning-off period is greater than the asynchronous time difference between the PFC circuit and the inverter circuit, it will result in further reduced performance. Therefore, the turning-off period needs to be determined by comprehensively considering a variety of aspects and the actual measurements and should leave a certain margin. The control procedure during zero-crossing operation will be fully described hereinafter with reference to the following embodiments.

Embodiment 1

Figure 2:
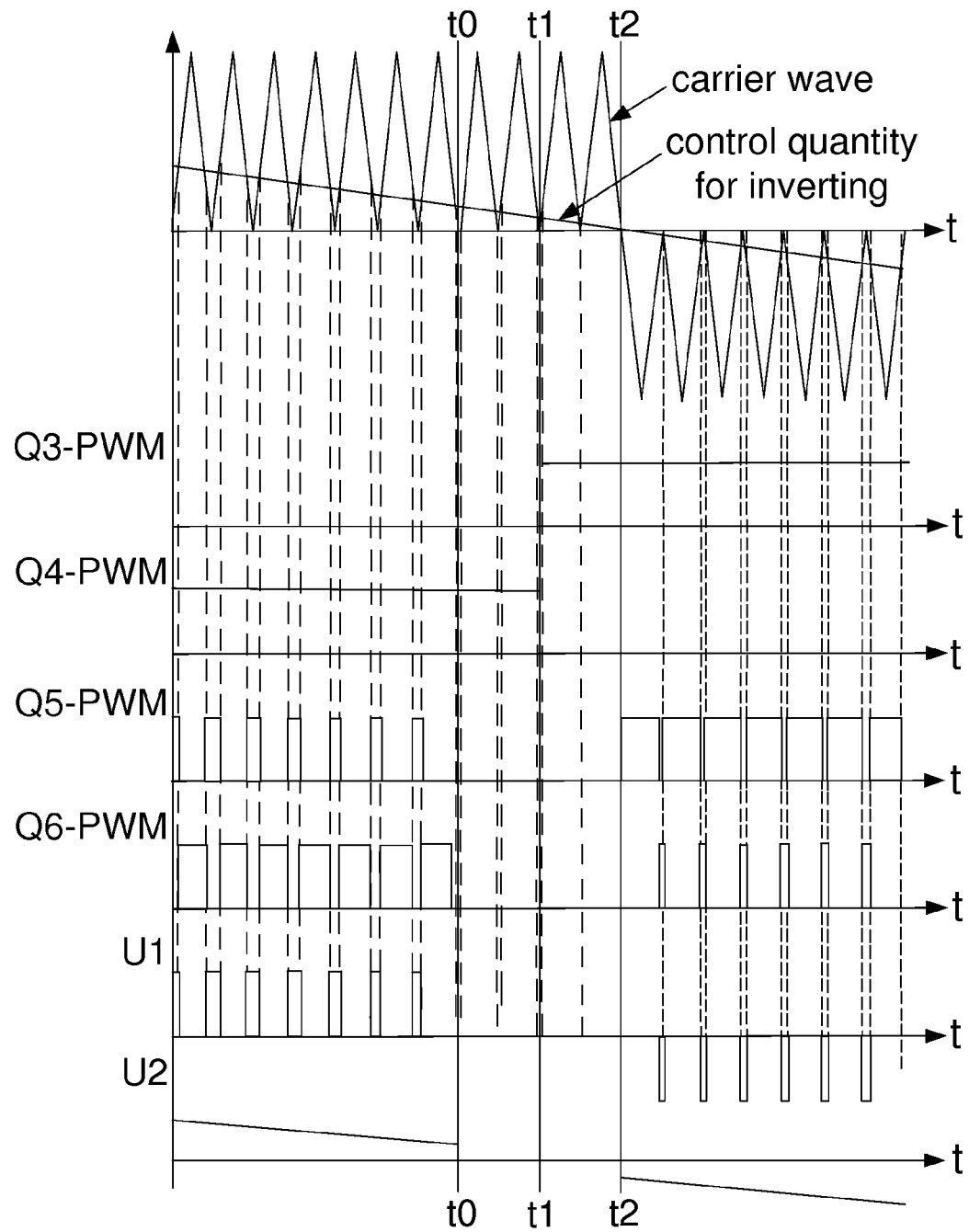
FIG. 2 is the schematic waveform of the driving signal of the switching transistor in the embodiment 1 according to the present invention.

The schematic waveform of the control signal in this embodiment is shown in FIG. 2. The waveforms Q3-PWM, Q4-PWM, Q5-PWM, and Q6-PWM correspond to the driving signals of the third switching transistor Q3, the fourth switching transistor Q4, the fifth switching transistor Q5 and the sixth switching transistor Q6, respectively. The waveform labeled U1 is a pulse-width modulation voltage outputted by an inverter bridge arm. A desired sine waveform voltage U2 is obtained after being filtered by an inductance L2 and a capacitance C2. Time t1 is the zero-crossing point of the PFC circuit from the positive half cycle to the negative half cycle. Due to the synchronization error the zero-crossing point of the inverter circuit from the positive half cycle to the negative half cycle is different from the zero-crossing point of the PFC circuit from the positive half cycle to the negative half cycle, and the time differences in various cycles may be different but the time difference between them in this embodiment is generally within two switching cycles. The zero-crossing point of the inverter circuit from the positive half cycle to the negative half cycle within the cycles shown in FIG. 2 is time t2, which lags behind the zero-crossing point of the PFC circuit from the positive half circuit to the negative half circuit by two switching cycles. Time t0 shown in FIG. 2 leads t1 by two switching cycles. The aforesaid switching cycles are the cycles of the driving signals of the switching transistors in the inverter bridge arm, the fifth switching transistor Q5 and the sixth switching transistor Q6.

The control method of the present embodiment is controlling the midline bridge arm and the rectifying bridge arm to operate synchronously, during the period t0-t2, controlling the inverter bridge arm to be disconnected, i.e., turning off the fifth switching transistor Q5 and the sixth switching transistor Q6 in the inverter bridge arm.

Before t1 the rectifying bridge arm is operating in the positive half cycle. During this time the midline bridge arm is also operating in the positive half cycle, the third switching transistor turns off, and the fourth switching transistor turns on. After t1 the rectifying bridge arm operates in the negative half cycle, and the midline bridge arm is in the negative half cycle as well, i.e., the third switching transistor Q3 turns on and the fourth switching transistor Q4 turns off. The operating status of the first switching transistor Q1 and the second switching transistor Q2 are set according to the operating status of the rectifying bridge arm (not shown). That is, when the rectifying bridge arm is operating in the positive half cycle, the first switching transistor Q1 turns off and the second switching transistor Q2 is controlled by the pulse-width modulation signal for boost control. When the rectifying bridge arm is operating in the negative half cycle the first switching transistor Q1 is controlled by the pulse-width modulation signal for boost control and the second switching transistor Q2 turns off.

In FIG. 2, since the period t0-t2 before and after the zero-crossing point is very short (in the magnitude of a microsecond), and the output voltage of the inverter nearby the zero-crossing closes to zero, turning off both the two switching transistors in the inverter bridge arms during this period has very slight influence on the waveform nearby the zero-crossing of the output sine voltage U2. However, the waveform of the output sine voltage U2 near the zero-crossing point would create a great oscillation without the control process as provided in the present embodiment, which will reduce the output THDv index. On the other hand, there is no influence on the waveform of the input current because the third switching transistor Q3 and the fourth switching transistor Q4 in the midline bridge arm are switched synchronously with the rectifying bridge arm. In addition, because it cannot be predicted whether the inverter bridge arm crosses zero earlier or later than the zero-crossing of the rectifying bridge arm, the inverter bridge arm are disconnected before and after the zero-crossing point t1 of the rectifying bridge arm. As such, the inverter bridge arm may be controlled no matter whether the zero-crossing point of the inverter bridge arm is earlier or later than the zero-crossing point of the rectifying bridge arm. The period length before and after time t1 is determined based on the time difference between the zero-crossing points of the inverter bridge arm and the rectifying bridge arm. A after being controlled for a period before and after the time t1, the inverter bridge arm and the rectifying bridge arm operate synchronously under the second status.

Figure 3:
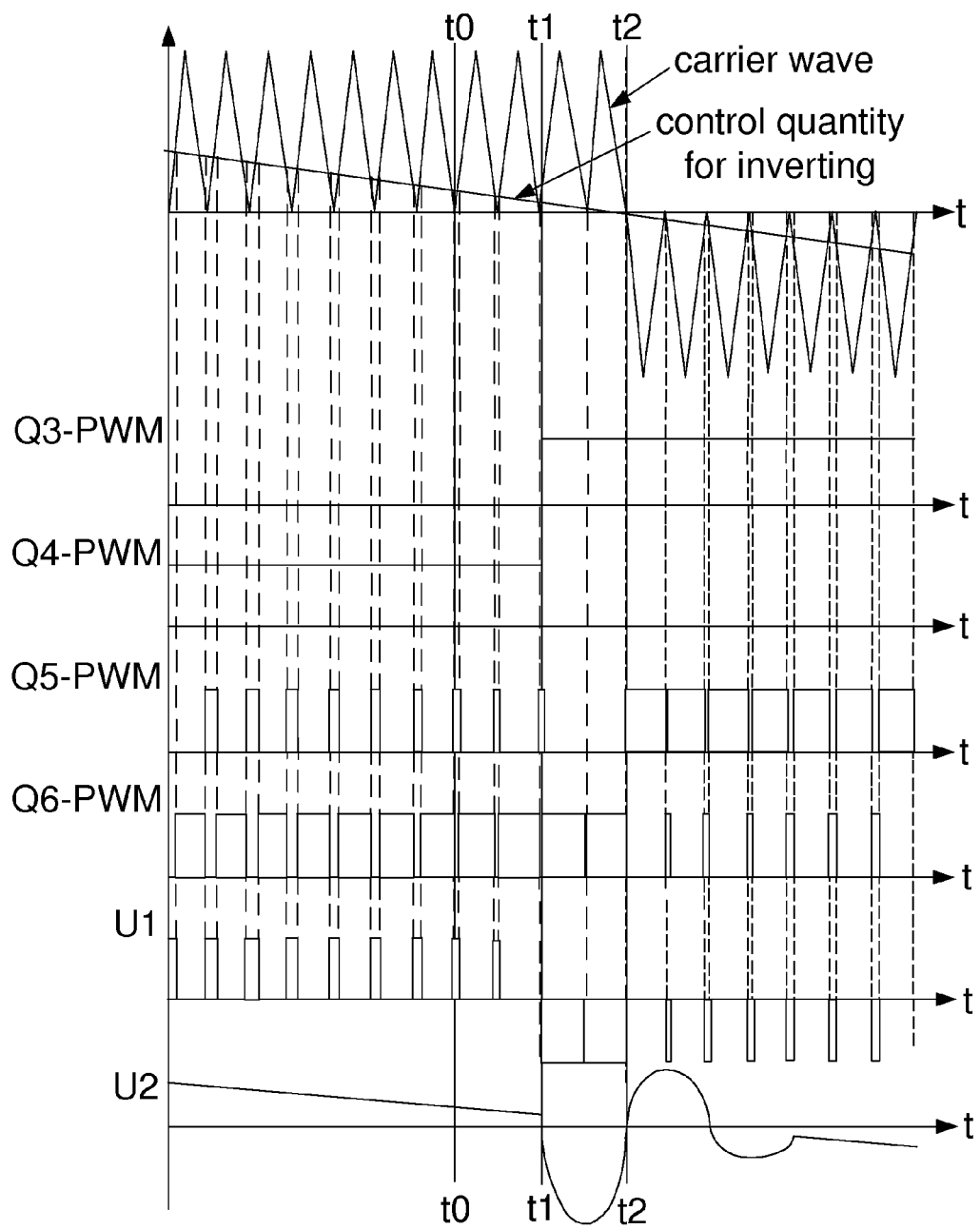
FIG. 3 is the schematic diagram of the UPS output voltage generating oscillation without control process provided in the embodiment 1 according to the present invention.

The analysis of the control in the present embodiment is provided herein, i.e., how to avoid the waveform oscillation of the sine voltage U2 nearby the zero-crossing caused by asynchronous zero-crossing switch between the PFC circuit and the inverter circuit, thus avoiding the influence of the asynchronous zero-crossing switch on the UPS performance index THDv. It will be assumed that there is no control process as provided in the present embodiment, and then the schematic diagram generating the oscillation is shown in FIG. 3. The working condition shown in FIG. 3 is almost the same as that shown in FIG. 2 except that the inverter bridge arm is not disconnected between t0-t2. The inverter bridge arm crosses zero later than the rectifying bridge arm, the zero-crossing point of the inverter bridge arm is t2, and the zero-crossing point of the rectifying bridge arm is t1. Due to the asynchronous zero-crossing switch between the inverter circuit and the PFC circuit, the PFC circuit has been operated in the negative half cycle after t1, and then the third switching transistor Q3 turns on. This is because the midline bridge arm and the rectifying bridge arm are controlled to operate synchronously. During the period t1-t2 the inverter bridge arm is in the positive half cycle closing to zero-crossing operating status. At this moment the driving pulse width of the sixth switching transistor Q6 is substantially wide. When the third switching transistor Q3 turns on the inverter bridge outputs two negative square-wave voltages with the same width as the driving pulse width of Q6. It then generates the UPS output voltage oscillation after filtering, as the oscillation of the waveform U2 shown in FIG. 3. The reference signs in FIG. 3 have the same meanings as the corresponding ones in FIG. 2. Nonetheless, in the present embodiment, two switching transistors Q5 and Q6 in the inverter bridge arm both are forced to be turned off during the period t1-t2 before and after the zero-crossing point. Thus, the oscillation loop above cannot be formed. This may avoid the wave oscillation of the UPS output sine voltage U2 nearby the zero-crossing caused by the asynchronous zero crossing switch between the PFC circuit and the inverter circuit. Consequently, this may reduce the influence of the asynchrony on the UPS performance indices.

Embodiment 2

The difference between the present embodiment and the embodiment 1 is that the present embodiment is the control of the rectifying bridge arm from the negative half cycle to the positive half cycle, while embodiment 1 is the control of the rectifying bridge arm from the positive half cycle to the negative half cycle.

Figure 4:
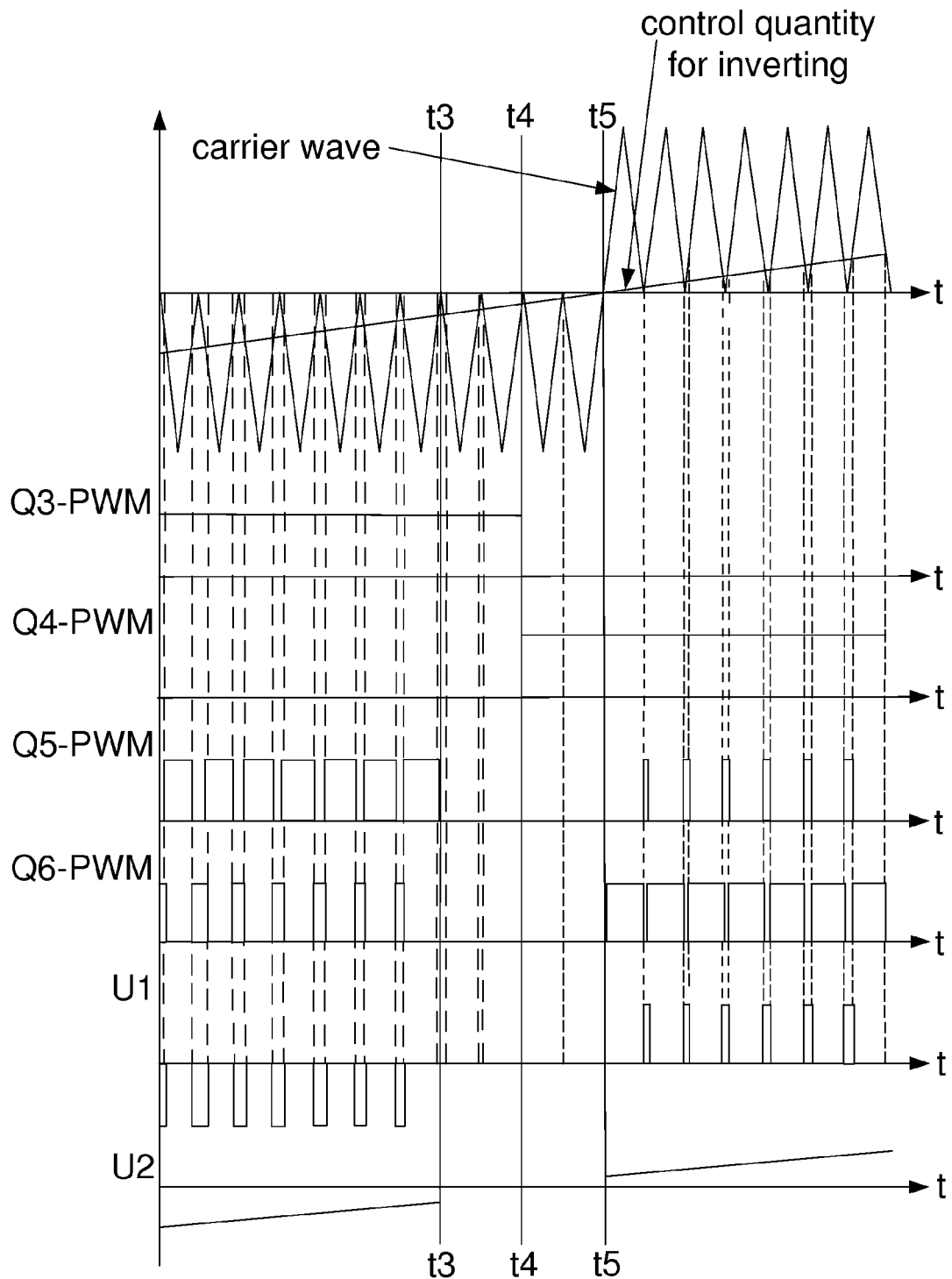
FIG. 4 is the schematic waveform of the driving signal of the switching transistor in the embodiment 2 according to the present invention.

The schematic waveform of the control signal in this embodiment is shown in FIG. 4. Waveforms Q3-PWM, Q4-PWM, Q5-PWM, and Q6-PWM correspond to the driving signals of the third switching transistor Q3, the fourth switching transistor Q4, the fifth switching transistor Q5 and the sixth switching transistor Q6, respectively. Waveform U1 is a pulse-width modulation voltage outputted by an inverter bridge arm, which is filtered by an inductance L2 and a capacitance C2 to produce a desired sine waveform U2. Time t4 is the zero-crossing point of the PFC circuit from the negative half cycle to the positive half cycle. Because of the synchronization error, the zero-crossing point of the inverter circuit from the negative half cycle to the positive half cycle is different from the zero-crossing point of the PFC circuit from the negative half cycle to the positive half cycle, and the period differences in various cycles may be different, but the period difference between those two in this embodiment is generally within two switching cycles. The zero-crossing point of the inverter circuit from the negative half cycle to the positive half cycle within the cycles shown in FIG. 4 is time t5, which lags behind the zero-crossing point of the PFC circuit from the negative half circuit to the positive half circuit by two switching cycles. Time t3 in this figure is two switching cycles before time t4. The aforesaid switching cycles are the cycles of the driving signals of the switching transistors in the inverter bridge arm, the fifth switching transistor Q5 and the sixth switching transistor Q6.

The control method of the present embodiment is controlling the midline bridge arm and the rectifying bridge arm to operate synchronously, and during the period t3-t5, controlling the inverter bridge arm to be disconnected and stop operating. That is, it is turning off the fifth switching transistor Q5 and the sixth switching transistor Q6 in the inverter bridge arm. Before time t4 the rectifying bridge arm is operating in the negative half cycle, so the midline bridge arm is also operating in the negative half cycle, the third switching transistor turns on, and the fourth switching transistor turns off. After time t4 the rectifying bridge arm has operated in the positive half cycle, so the midline bridge arm is in the positive half cycle as well, i.e., the third switching transistor Q3 turns off, and the fourth switching transistor Q4 turns on. The first switching transistor Q1 and the second switching transistor Q2 are set according to the operating status of the rectifying bridge arm (not shown), i.e., when the rectifying bridge arm is operating in the positive half cycle, the first switching transistor Q1 turns off, and the second switching transistor Q2 is controlled by the pulse-width modulation signal for boost control. When the rectifying bridge arm is operating in the negative half cycle, the first switching transistor Q1 is controlled by the pulse-width modulation signal for boost control, and the second switching transistor Q2 turns off.

In FIG. 4, since the period t3-t5 before and after the zero-crossing point is very short and in the magnitude of a microsecond, and the output voltage of the inverter nearby the zero-crossing closes to zero, turning off both switching transistors in the inverter bridge arm during this period has only a very slight influence on the waveform of the output sine voltage U2 nearby the zero-crossing. However, the waveform of the output sine voltage U2 nearby the zero-crossing point would create a great oscillation without the control process as provided in the present embodiment, which will reduce the output THDv index. On the other hand, there is no influence on the waveform of the input current because the third switching transistor Q3 and the fourth switching transistor Q4 in the midline bridge arm are switched synchronously with the rectifying bridge arm. In addition, because it cannot be predicted whether the inverter bridge arm crosses zero earlier or later than the zero-crossing of the rectifying bridge arm, the inverter bridge arm is disconnected before and after the zero-crossing point of the rectifying bridge arm t4. Thus, the inverter bridge arm may be controlled no matter whether the zero-crossing point of the inverter bridge arm is earlier or later than the zero-crossing point of the rectifying bridge arm. The period length before and after time t4 is determined based on the time difference between the zero-crossing points of the inverter bridge arm and the rectifying bridge arm. After being controlled for a period before and after the time t4, the inverter bridge arm and the rectifying bridge arm would operate synchronously under the first status.

Figure 5:
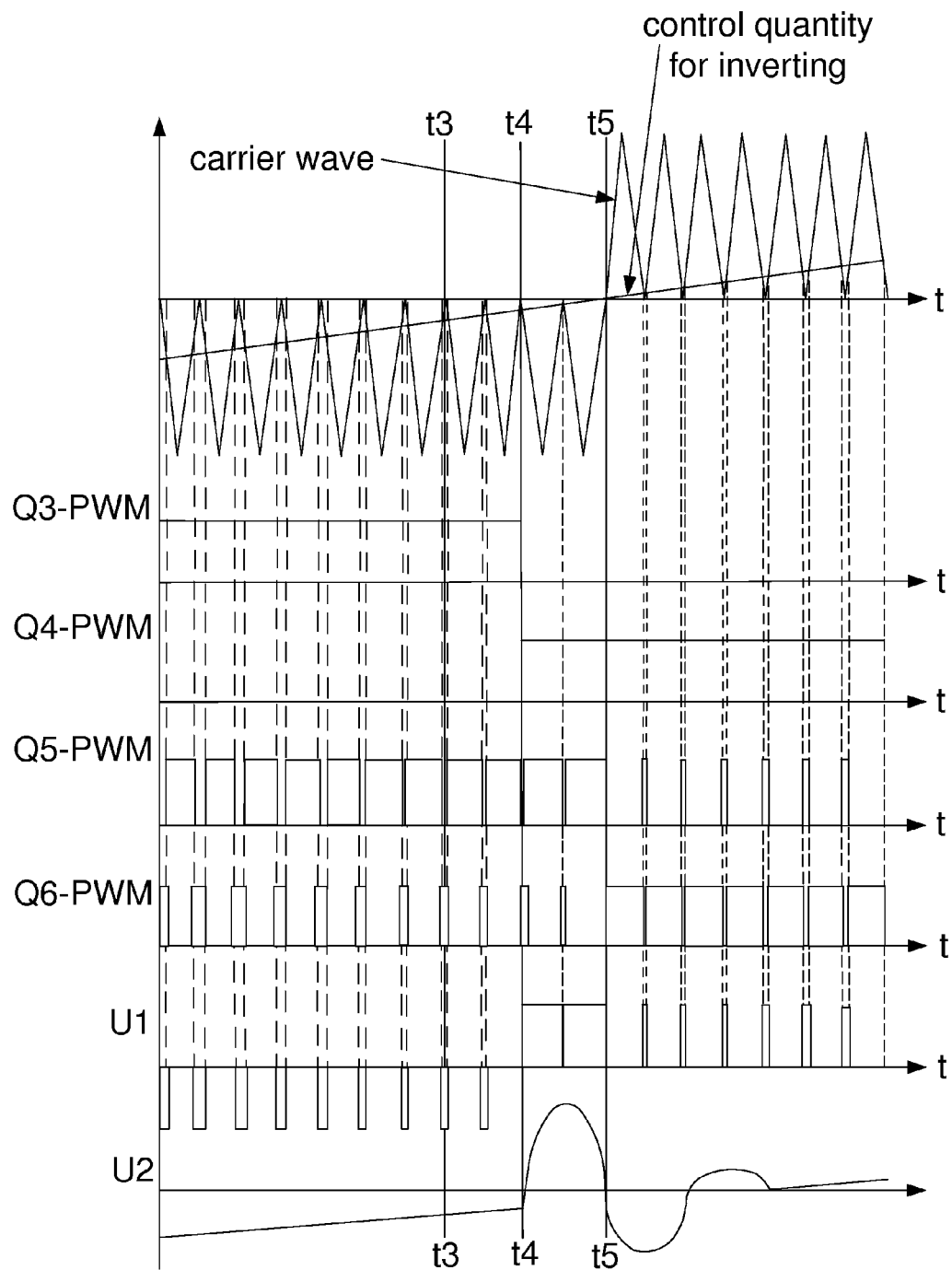
FIG. 5 is the schematic diagram of the UPS output voltage generating oscillation without control process provided in the embodiment 2 of the present invention.

The analysis of the control process in the present embodiment is provided herein, i.e., how to avoid the waveform oscillation of the sine voltage U2 nearby the zero-crossing caused by asynchronous zero-crossing switch between the PFC circuit and the inverter circuit, to thereby to avoid the influence of the asynchronous zero-crossing switch on the UPS performance index THDv. It is assumed that there is no control process as provided in the present embodiment, and then the schematic diagram generating oscillation is shown in FIG. 5. The working condition shown in FIG. 5 is almost the same as that shown in FIG. 4 except that the inverter bridge arm is not disconnected between t3-t5. The inverter bridge arm crosses zero later than the rectifying bridge arm, wherein the zero-crossing point of the inverter bridge arm is t5, and the zero-crossing point of the rectifying bridge arm is t4. Due to asynchronous zero-crossing switch between the inverter circuit and the PFC circuit, the PFC circuit has operated in the positive half cycle after t4. Then the fourth switching transistor Q4 turns on since the midline bridge arm and the rectifying bridge arm are controlled to operate synchronously. During the period t4-t5, the inverter bridge arm is in the negative half cycle closing to zero-crossing operating status, at this moment, the driving pulse width of the fifth switching transistor Q5 is relatively wide. When the fourth switching transistor Q4 turns on the inverter bridge outputs two positive square-wave voltages with the same width as the driving pulse width of Q5, and generates the UPS output voltage oscillation after filtering, as the oscillation of the waveform U2 shown in FIG. 5. The reference signs in FIG. 5 have the same meanings as the corresponding ones in FIG. 4. In the present embodiment two switching transistors Q5 and Q6 in the inverter bridge arm both are forced to be turned off during the period t3-t5 before and after the zero-crossing point, and thus the above-mentioned oscillation loop cannot be formed. This may avoid the wave oscillation of the UPS output sine voltage U2 nearby the zero-crossing caused by the asynchronous zero-crossing switch between the PFC circuit and the inverter circuit, and consequently reduce the influence of the asynchrony on the UPS performance indices.

Embodiment 3

The difference between the present embodiment and the preceding two embodiments is that the present embodiment controls the midline bridge arm and the inverter bridge arm to cross zero synchronously, and disconnects the rectifying bridge arm during a period before and after zero-crossing of the inverter. The preceding two embodiments, however, control the midline bridge arm and the rectifying bridge arm to cross zero synchronously and disconnect the inverter bridge arm during a period before and after zero-crossing of the rectifying bridge arm.

Figure 6:
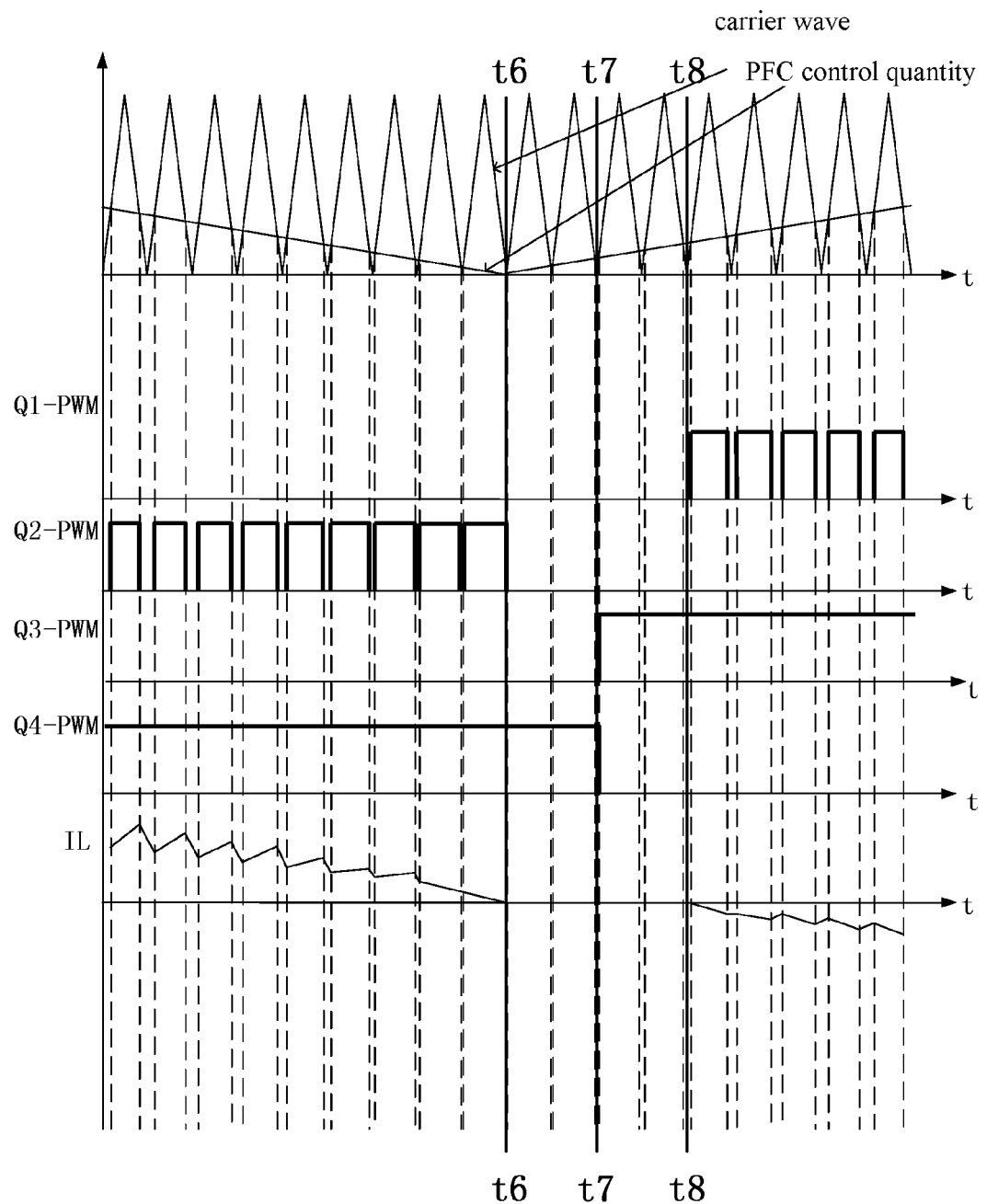
FIG. 6 is the schematic waveform of the driving signal of the switching transistor in the embodiment 3 according to the present invention.

FIG. 6 is the schematic waveform of the control signal in the present embodiment. As shown in FIG. 6, Q1-PWM, Q2-PWM, Q3-PWM, and Q4-PWM correspond to the driving signals of the first switching transistor Q1, the second switching transistor Q2, the third switching transistor Q3, and the fourth switching transistor Q4, respectively. The IL waveform is the current on the inductance L1. Time t7 is the zero-crossing point of the inverter bridge arm from the positive half cycle to the negative half cycle. Due to the synchronization error, the zero-crossing point of the inverter circuit from the positive half cycle to the negative half cycle is different from the zero-crossing point of the PFC circuit from the positive half cycle to the negative half cycle, and the period differences in various cycles may be different, but the period difference between those two is generally within two switching cycles in the present embodiment. The zero-crossing point of the PFC circuit from the positive half cycle to the negative half cycle within the cycle shown in FIG. 6 is time t6. This leads the zero-crossing point of the inverter circuit from the positive half circuit to the negative half circuit by two switching cycles. Time t8 in the figure is two switching cycles later than time t7. The aforesaid switching cycles are the cycles of the driving signals of the switching transistors in the rectifying bridge arm, the first switching transistor Q1 and the second switching transistor Q2.

The control method of the embodiment is controlling the midline bridge arm and the inverter bridge arm to operate synchronously, and during the period t6-t8, controlling the rectifying bridge arm to be disconnected and stop operating, i.e., turning off the first switching transistor Q1 and the second switching transistor Q2 in the rectifying bridge arm. Before time t7, the inverter bridge arm is operating in the positive half cycle. The midline bridge arm is also controlled in the positive half cycle operating status, the third switching transistor turns off, the fourth switching transistor turns on, and the rectifying bridge arm is disconnected, i.e., the first switching transistor Q1 and the second switching transistor Q2 in the rectifying bridge arm both turn off. After time t7 the inverter bridge arm has operated in the negative half cycle, and then the midline bridge arm is in the negative half cycle as well, i.e., the third switching transistor Q3 turns on, the fourth switching transistor Q4 turns off, and the rectifying bridge arm is disconnected, i.e., the first switching transistor Q1 and the second switching transistor Q2 in the rectifying bridge arm both turn off. The fifth switching transistor Q5 and the sixth switching transistor Q6 are set according to the operating status of the inverter bridge arm (not shown). That is, when the inverter bridge arm is operating in the positive half cycle, the fifth switching transistor Q5 adopts the SPWM control and operates based on the control quantity of the inverter and the driving signal generated by the carrier wave. The sixth switching transistor Q6 and the fifth switching transistor Q5 operate complementarily. When the inverter bridge arm is operating in the negative half cycle the sixth switching transistor Q6 adopts the SPWM control and operates based on the control quantity of the inverter and the driving signal generated by the carrier wave. The fifth switching transistor Q5 and the sixth switching transistor Q6 operate complementarily.

In FIG. 6, since the period t6-t8 before and after the zero-crossing point is very short and in the magnitude of a microsecond. The current IL on the inductance L1 nearby the zero-crossing closes to zero, turning off both the two switching transistors Q1 and Q2 in the rectifying bridge arms during this period has very slight influence on the waveform of the current IL of the inductance L1 nearby the zero-crossing. However, the waveform of the current IL nearby the zero-crossing would create a great oscillation without the control process as provided in the present embodiment, which will reduce the input THDi index. On the other hand, there is no influence on the waveform of the output sine wave voltage U2 because the third switching transistor Q3 and the fourth switching transistor Q4 in the midline bridge arm are switched synchronously with the inverter bridge arm. In addition, because it cannot be predicted whether the rectifying bridge arm crosses zero earlier or later than the zero-crossing of the inverter bridge arm, the rectifying bridge arm is disconnected both before and after the zero-crossing point t7 of the inverter bridge arm, thereby the rectifying bridge arm may be controlled no matter whether the zero-crossing point of the rectifying bridge arm is earlier or later than the zero-crossing point of the inverter bridge arm. The period length before and after time t7 is determined based on the time difference between the zero-crossing points of the inverter bridge arm and the rectifying bridge arm. After being controlled for a period before and after time t7, the inverter bridge arm and the rectifying bridge arm operate synchronously under the second status.

Figure 7:
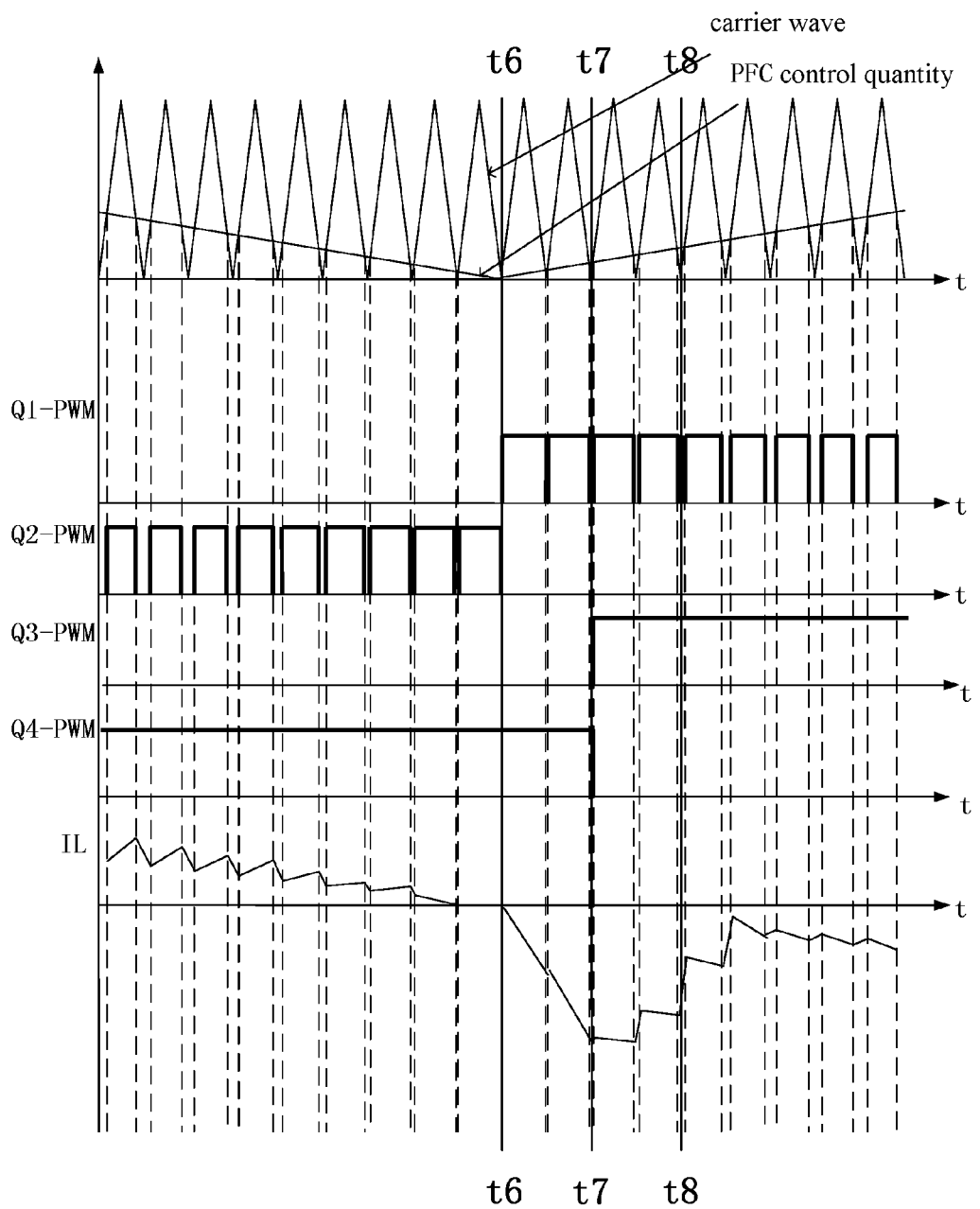
FIG. 7 is the schematic diagram of the inductance current generating oscillation without control process provided in the embodiment 3 according to the present invention.

The analysis of the control in the present embodiment is provided herein, i.e., how to avoid the waveform oscillation of the current IL of the inductance L1 nearby the zero-crossing caused by asynchronous zero-crossing switch between the PFC circuit and the inverter circuit, thereby to avoid the influence of the asynchronous zero-crossing switch on the UPS performance index THDi. It is assumed that there is no control process as provided in the present embodiment, and then the schematic diagram generating oscillation is shown in FIG. 7. The working condition shown in FIG. 7 is almost the same as that shown in FIG. 6 except that the inverter bridge arm is not disconnected during t6-t8. The inverter bridge arm crosses zero later than the rectifying bridge arm, the inverter zero-crossing point is t7, and the rectifying zero-crossing is t6. Due to asynchronous zero-crossing switch between the inverter circuit and the PFC circuit the PFC circuit has operated in the negative half cycle after time t6, and due to controlling the midline bridge arm and the inverter bridge arm to operate synchronously, the statuses of those two switching transistors in the midline bridge arm do not change. That is, the fourth switching transistor Q4 still turns on. However, at this moment the rectifying bridge arm is in the negative half cycle, and just at the beginning of the negative half cycle, and the pulse width of the first switching transistor Q1 is relatively wide. In addition, at this moment the mains power supply crosses zero, the voltage on the capacitance C1 closes to zero as well, and then the busbar capacitance DC will discharge for a longer period via the following loop: the positive busbar end—the first switching transistor Q1—the inductance L1—the capacitance C1—the neutral line N—the fourth switching transistor Q4-IGBT—the negative busbar end, which may result in wave oscillation of the current IL of the inductance L1, as shown in FIG. 7. The reference signs in FIG. 7 have the same meanings as the corresponding ones in FIG. 6. Nonetheless, in the present embodiment, two switching transistors Q1 and Q2 in the rectifying bridge arm both are forced to be turned off during the period t6-t8. Thus, the above-mentioned oscillation loop cannot be formed. This may avoid the wave oscillation of the current IL of the inductance L1 nearby the zero-crossing caused by the asynchronous zero-crossing switch between the PFC circuit and the inverter circuit, and consequently thus reduce the influence of the asynchrony on the UPS performance indices.

Embodiment 4

The present embodiment differs from embodiment 3 in that the present embodiment is the control status of the inverter bridge arm from the negative half cycle to the positive half cycle, while embodiment 3 is the control status of the inverter bridge arm from the positive half cycle to the negative half cycle.

Figure 8:
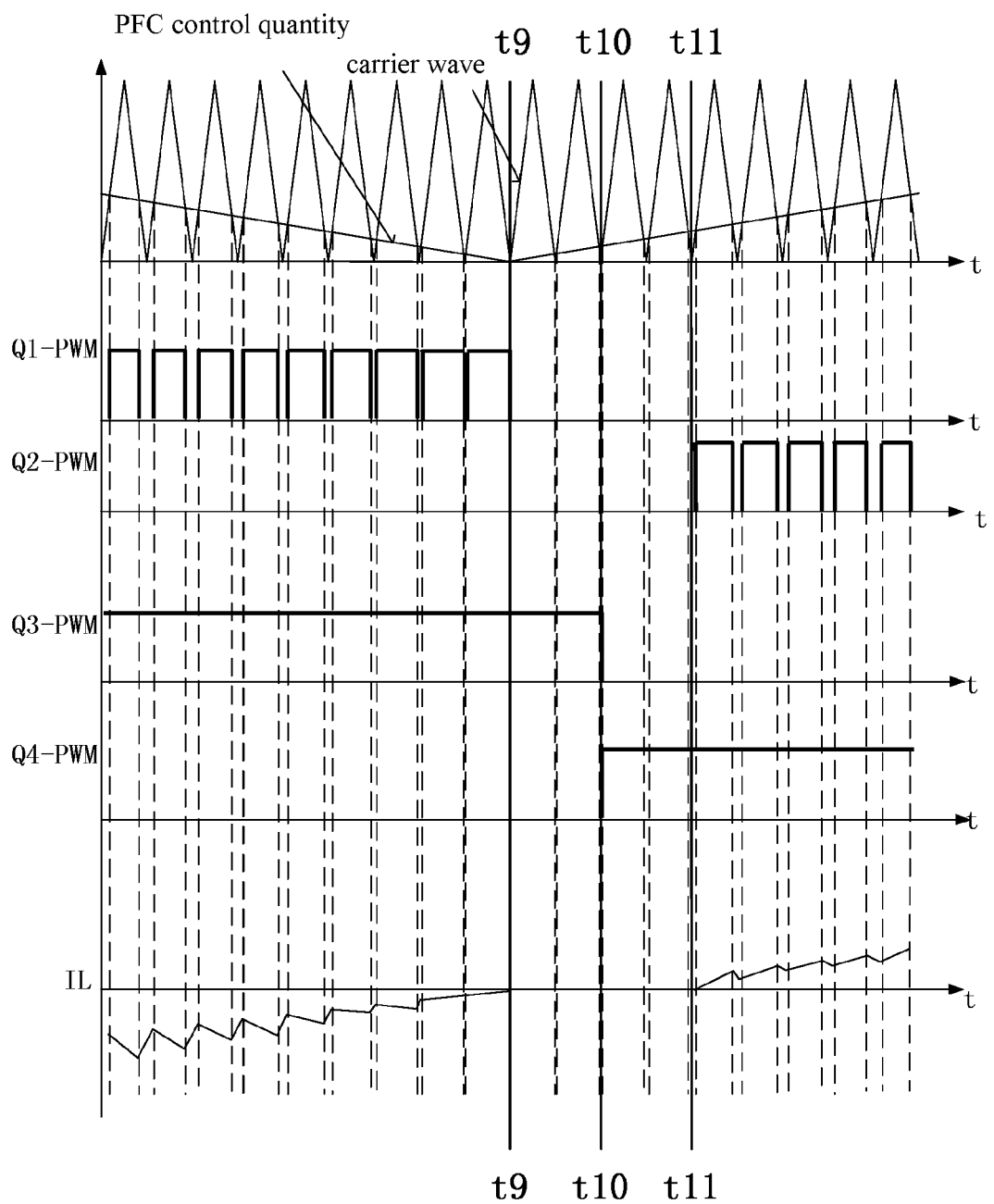
FIG. 8 is the schematic waveform of the driving signal of the switching transistor in the embodiment 4 according to the present invention.

FIG. 8 is the schematic waveform of the control signal in the present embodiment. As shown in FIG. 8, waveforms Q1-PWM, Q2-PWM, Q3-PWM, and Q4-PWM correspond to the driving signals of the first switching transistor Q1, the second switching transistor Q2, the third switching transistor Q3, and the fourth switching transistor Q4, respectively. IL is the current on the inductance L1. Time t10 is the zero-crossing point of the inverter bridge arm from the negative half cycle to the positive half cycle. Due to the synchronization error, the zero-crossing point of the inverter circuit from the negative half cycle to the positive half cycle is different from the zero-crossing point of the PFC circuit from the negative half cycle to the positive half cycle. The period differences in various cycles may also be different, but the period difference between those two is generally within two switching cycles in the present embodiment. The zero-crossing point of the PFC circuit from the negative half cycle to the positive half cycle within the cycles shown in FIG. 8 is time t9, which leads the zero-crossing point of the inverter circuit from the negative half circuit to the positive half cycle by two switching cycles. Time t11 in the figure is two switching cycles later than time t9. The aforesaid switching cycles are the cycles of the driving signals of the switching transistors in the rectifying bridge arm, the first switching transistor Q1 and the second switching transistor Q2.

The control method of the embodiment is controlling the midline bridge arm and the inverter bridge arm to operate synchronously, and during the period t9-t11, controlling the rectifying bridge arm to be disconnected and stop operating, i.e. turning off the first switching transistor Q1 and the second switching transistor Q2 in the rectifying bridge arm. Before time t10 the inverter bridge arm operates in the negative half cycle, so the midline bridge arm is also controlled in the negative half cycle, the third switching transistor turns on, the fourth switching transistor turns off, and the rectifying bridge arm is disconnected, i.e., the first switching transistor Q1 and the second switching transistor Q2 in the rectifying bridge arm both turn off. After time t10, the inverter bridge arm has operated in the positive half cycle, and then the midline bridge arm is in the positive half cycle as well. That is, the third switching transistor Q3 turns off, the fourth switching transistor Q4 turns on, and the rectifying bridge arm is disconnected, i.e., the first switching transistor Q1 and the second switching transistor Q2 in the rectifying bridge arm both turn off. The fifth switching transistor Q5 and the sixth switching transistor Q6 are set according to the operating status of the inverter bridge arm (not shown), i.e., when the inverter bridge arm is operating in the positive half cycle, the fifth switching transistor Q5 adopts the SPWM control and operates based on the control quantity of the inverter and the driving signal generated by the carrier wave, and the sixth switching transistor Q6 and the fifth switching transistor Q5 operate complementarily. When the inverter bridge arm is operating in the negative half cycle, the sixth switching transistor Q6 adopts the SPWM control and operates based on the control quantity of the inverter and the driving signal generated by the carrier wave, and the fifth switching transistor Q5 and the sixth switching transistor Q6 operate complementarily.

In FIG. 8, since the period t9-t11 before and after the zero-crossing point is very short and in the magnitude of a microsecond, and the current IL on the inductance L1 nearby the zero-crossing closes to zero, turning off both the two switching transistors Q1 and Q2 in the rectifying bridge arms during this period has very slight influence on the waveform of the current IL of the inductance L1 nearby the zero-crossing. However, the waveform of the current IL nearby the zero-crossing would create a great oscillation without the control process as provided in the present embodiment, which will reduce the input THDi index. On the other hand there is no influence on the waveform of the output sine wave voltage U2 because the third switching transistor Q3 and the fourth switching transistor Q4 in the midline bridge arm are switched synchronously with the inverter bridge arm. In addition, because it cannot be predicted whether the rectifying bridge arm crosses zero earlier or later than the zero-crossing of the inverter bridge arm, the rectifying bridge arm is disconnected both before and after the zero-crossing point t10 of the inverter bridge arm. Thus, the rectifying bridge arm may be controlled no matter whether the zero-crossing point of the rectifying bridge arm is earlier or later than the zero-crossing point of the inverter bridge arm. The period length before and after time t10 is determined based on the time difference between the zero-crossing points of the inverter bridge arm and the rectifying bridge arm. And after being controlled for a period before and after time t10, the inverter bridge arm and the rectifying bridge arm operate synchronously under the first status.

Figure 9:
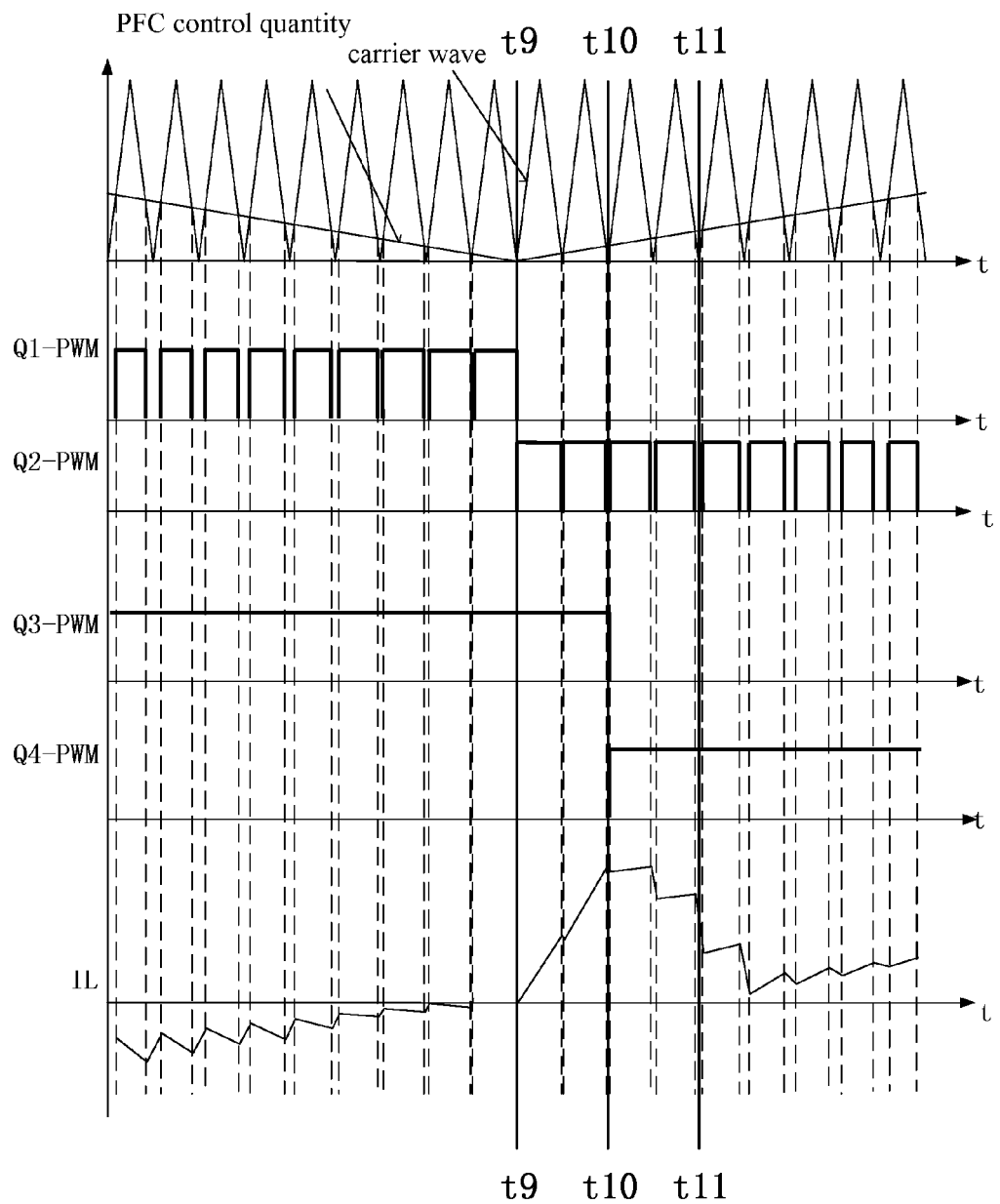
FIG. 9 is the schematic diagram of the inductance current generating oscillation without control process provided in the embodiment 4 according to the present invention.

The analysis of the control in the present embodiment is provided herein, i.e., how to avoid the waveform oscillation of the current IL of the inductance L1 nearby the zero-crossing caused by asynchronous zero-crossing switch between the PFC circuit and the inverter circuit, to thus avoid the influence of the asynchronous zero-crossing switch on the UPS performance index THDi. It is assumed that there is no control as provided in the present embodiment, and then the schematic diagram generating oscillation is shown in FIG. 9. The working condition shown in FIG. 9 is almost the same as that shown in FIG. 8 except that the inverter bridge arm is not disconnected during t9-t11. The inverter bridge arm crosses zero later than the rectifying bridge arm, the inverter zero-crossing point is t10, and the rectifying zero-crossing is t9. Due to asynchronous zero-crossing switch between the inverter circuit and the PFC circuit, the PFC circuit has operated in the positive half cycle after time t9, and due to controlling the midline bridge arm and the inverter bridge arm to operate synchronously, the statuses of those two switching transistors in the midline bridge arm do not change. That is, the third switching transistor Q3 still turns on. However, at this moment the rectifying bridge arm is in the positive half cycle, and just at the beginning of the positive half cycle, and the pulse width of the second switching transistor Q2 is relatively wide. In addition, at this moment, the mains power supply crosses zero, the voltage on the capacitance C1 closes to zero as well, and then the busbar capacitance DC will discharge for a longer period via the following loop: the positive busbar end—the third switching transistor Q3-IGBT—the neutral line N—the capacitance C1—the inductance L1—the second switching transistor Q2—the negative busbar end. This may result in waveform oscillation of the current IL of the inductance L1, as shown in FIG. 9. The reference signs in FIG. 9 have the same meanings as the corresponding ones in FIG. 8. Nonetheless, in the present embodiment, two switching transistors Q1 and Q2 in the rectifying bridge arm both are forced to be turned off during the period t9-t11, and thus the above-mentioned oscillation loop cannot be formed, which may avoid the wave oscillation of the current IL of the inductance L1 nearby the zero-crossing caused by the asynchronous zero-crossing switch between the PFC circuit and the inverter circuit, and consequently reduce the influence of the asynchrony on the UPS performance indices.

The above-mentioned content is the detailed description of the present invention with reference to the specific preferred examples, which cannot be interpreted to limit the present invention. To those ordinary skilled in the art of the present invention, several alternatives and significant modifications made without departure from the spirit of the invention with the same performance or propose should be considered as being within the protection scope of the present invention.

The invention claimed is:

1. A control method to control zero-crossing operation of bridge arms in an uninterruptible power supply (UPS), wherein the UPS has a rectifying bridge arm consisting of a first switching transistor (Q1) and a second switching transistor (Q2), a midline bridge arm consisting of a third switching transistor (Q3) and a fourth switching transistor (Q4), and an inverter bridge arm consisting of a fifth switching transistor (Q5) and a sixth switching transistor (Q6), the method comprising:
   controlling the midline bridge arm and the rectifying bridge arm to cross zero synchronously;
   controlling both the fifth and sixth switching transistors of the inverter bridge arm to be continuously disconnected during a period beginning before a zero-crossing point of the rectifying bridge arm to a period after the zero-crossing point of the rectifying bridge arm has been passed; and
   wherein a first period length before the zero-crossing point and a second period length after the zero-crossing point are determined based on a time difference between a zero-crossing point of the inverter bridge arm and the zero-crossing point of the rectifying bridge arm.

2. The control method to control the zero-crossing operation of the bridge arms in the UPS of claim 1, wherein the zero-crossing point of the rectifying bridge arm is a zero-crossing point of the rectifying bridge arm from a positive half cycle to a negative half cycle, or a zero-crossing point of the rectifying bridge arm from the negative half cycle to the positive half cycle.

3. The control method to control the zero-crossing operation of the bridge arms in the UPS of claim 2, further comprising:
   during the period before the rectifying bridge arm reaches the crossing zero from the positive half cycle to the negative half cycle, turning off the third switching transistor (Q3) and turning on the fourth switching transistor (Q4), while both the fifth switching transistor (Q5) and the sixth switching transistor (Q6) are turned off;
   during the period after the zero-crossing point of the rectifying bridge arm, turning on the third switching transistor (Q3) and turning off the fourth switching transistor (Q4), while both the fifth switching transistor (Q5) and sixth switching transistor (Q6) are turned off; and
   wherein the period before and the period after the zero-crossing point of the rectifying bridge arm each are twice as much as a cycle of a driving signal for the fifth switching transistor (Q5) or the sixth switching transistor (Q6).

4. The control method to control the zero-crossing operation of the bridge arms in the UPS of claim 2, further comprising:
   when the rectifying bridge arm is crossing zero from the negative half cycle to the positive half cycle, turning on the third switching transistor (Q3) and turning off the fourth switching transistor (Q4), while both the fifth switching transistor (Q5) and the sixth switching transistor (Q6) are turned off during the period before the zero-crossing point of the rectifying bridge arm is reached;

turning off the third switching transistor (Q3) and turning on the fourth switching transistor (Q4), while both the fifth switching transistor (Q5) and sixth switching transistor (Q6) are turned off during the period after the zero-crossing point of the rectifying bridge arm is passed; and wherein the period before and the period after the zero-crossing point of the rectifying bridge arm each are twice as much as a cycle of a driving signal for the fifth switching transistor (Q5) or the sixth switching transistor (Q6).

5. A control method to control zero-crossing operation of bridge arms in an uninterruptible power supply (UPS), the UPS having a rectifying bridge arm consisting of a first switching transistor (Q1) and a second switching transistor (Q2), a midline bridge arm consisting of a third switching transistor (Q3) and a fourth switching transistor (Q4), and an inverter bridge arm consisting of a fifth switching transistor (Q5) and a sixth switching transistor (Q6), the method comprising:

controlling the midline bridge arm and the inverter bridge arm to cross zero synchronously and controlling the first and second switching transistors of the rectifying bridge arm to be continuously disconnected throughout a period beginning before a zero-crossing point of the inverter bridge arm is reached, and until a period after the zero-crossing point of the inverter bridge arm has occurred; and wherein a first period length before the zero-crossing point and a second period length after the zero-crossing point are determined based on a time difference between a zero-crossing point of the inverter bridge arm and the zero-crossing point of the rectifying bridge arm.

6. The control method to control the zero-crossing operation of the bridge arms in the UPS of claim 5, wherein the zero-crossing point of the inverter bridge arm is a zero-crossing point of the inverter bridge arm from a positive half cycle to a negative half cycle, or a zero-crossing point of the inverter bridge arm from the negative half cycle to the positive half cycle.

7. The control method to control the zero-crossing operation of the bridge arms in the UPS of claim 6, further comprising:

for the period before the inverter bridge arm begins crossing zero from the positive half cycle to the negative half cycle,
turning off the third switching transistor (Q3) and turning on the fourth switching transistor (Q4);
turning on the third switching transistor (Q3) and turning off the fourth switching transistor (Q4); and
wherein the period before and the period after the zero-crossing point of the inverter bridge arm each are twice as much as a cycle of a driving signal for the first switching transistor (Q1) or the second switching transistor (Q2).

8. The control method to control the zero-crossing operation of the bridge arms in UPS of claim 6, further comprising:

during the period before the inverter bridge arm begins crossing zero from the negative half cycle to the positive half cycle, turning on the third switching transistor (Q3) and turning off the fourth switching transistor (Q4), while both the first switching transistor (Q1) and the second switching transistor (Q2) are turned off;

turning off the third switching transistor (Q3) and turning on the fourth switching transistor (Q4), while both the first switching transistor (Q1) and second switching transistor (Q2) are turned off;

wherein the period before and the period after the zero-crossing point of the inverter bridge arm each are twice as much as a cycle of a driving signal for the first switching transistor (Q1) or the second switching transistor (Q2).

9. A method for controlling a zero-crossing operation of the bridge arms in an uninterruptible power supply (UPS), the UPS comprising a rectifying bridge arm, a midline bridge arm and an inverter bridge arm coupled in parallel, the method comprising:

controlling the midline bridge arm and the rectifying bridge arm to cross zero synchronously;

controlling the inverter bridge arm to be disconnected continuously during a period extending before a zero-crossing point of the rectifying bridge arm to a period after the zero-crossing point of the rectifying bridge arm, and wherein a first period length before the zero-crossing point and a second period length after the zero-crossing point are determined based on a time difference between a zero-crossing point of the inverter bridge arm and the zero-crossing point of the rectifying bridge arm.

10. The method of claim 9, further comprising:
configuring the UPS to have:
the rectifying bridge arm consisting of a first switching transistor (Q1) and a second switching transistor (Q2);
the midline bridge arm consisting of a third switching transistor (Q3) and a fourth switching transistor (Q4);
the inverter bridge arm consisting of a fifth switching transistor (Q5) and a sixth switching transistor (Q6); and further controlling the UPS such that:
during the period before the rectifying bridge arm begins crossing zero from the positive half cycle to the negative half cycle, turning off the third switching transistor (Q3) and turning on the fourth switching transistor (Q4), and turning off both the fifth switching transistor (Q5) and the sixth switching transistor (Q6);

turning on the third switching transistor (Q3) and turning off the fourth switching transistor (Q4), and turning off both the fifth switching transistor (Q5) and sixth switching transistor (Q6), during the period after the zero-crossing point of the rectifying bridge arm; and wherein the period before and the period after the zero-crossing point of the rectifying bridge arm each are twice as much as a cycle of a driving signal for the fifth switching transistor (Q5) or the sixth switching transistor (Q6).

11. The method of claim 9, wherein the zero-crossing point of the rectifying bridge arm is a zero-crossing point of the rectifying bridge arm from a positive half cycle to a negative half cycle, or a zero-crossing point of the rectifying bridge arm from the negative half cycle to the positive half cycle.

12. The method of claim 11, further comprising:
during the period before the rectifying bridge arm begins crossing zero from the negative half cycle to the positive half cycle, turning on the third switching transistor (Q3) and turning off the fourth switching transistor (Q4), and turning off both the fifth switching transistor (Q5) and the sixth switching transistor (Q6);

turning off the third switching transistor (Q3) and turning on the fourth switching transistor (Q4), and turning off both the fifth switching transistor (Q5) and sixth switching transistor (Q6), during the period after the zero-crossing point of the rectifying bridge arm; and wherein the period before and the period after the zero-crossing point of the rectifying bridge arm each are twice as much as a cycle of a driving signal for the fifth switching transistor (Q5) or the sixth switching transistor (Q6).

* * * * *